Figure 1:
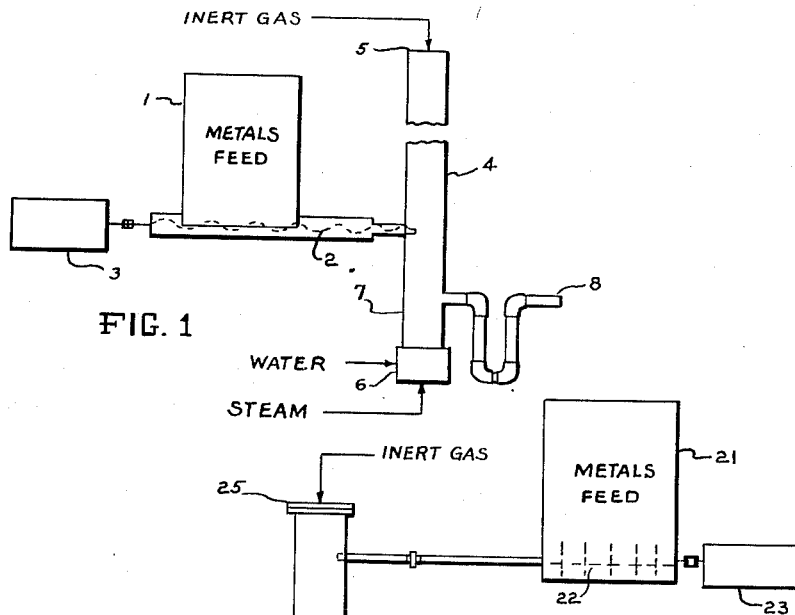

Nov. 24, 1953  F. L. PADGITT  2,660,517
PRODUCTION OF SODIUM HYDROXIDE AND
HYDROGEN FROM ELEMENTAL SODIUM
Filed Jan. 29, 1952

INVENTOR.
FRANK L. PADGITT
BY Kenneth Swartwood
ATTORNEY

Patented Nov. 24, 1953

2,660,517

UNITED STATES PATENT OFFICE 2,660,517

PRODUCTION OF SODIUM HYDROXIDE AND HYDROGEN FROM ELEMENTAL SODIUM

Frank L. Padgitt, Baton Rouge, La., assignor to Ethyl Corporation, New York, N. Y., a corporation of Delaware Application January 29, 1952, Serial No. 268,743

5 Claims. (Cl. 23—184)

This invention relates to a new and improved process for conversion of active metals to the hydroxide derivative. More particularly, the invention concerns a process for direct reaction of water with an alkali metal to generate the corresponding hydroxide, wherein the alkali metal may be in a pure or highly refined form, but alternatively may be the major component of a mixture with other reactive components and with impurities.

Alkali metal hydroxides have for many years been prepared by electrolysis of aqueous alkali metal halide solutions or by metathesis in aqueous solution between an alkaline earth metal hydroxide and an alkali metal carbonate. These common procedures obviously result in hydrous alkali metal hydroxides. To dehydrate these and recover moisture-free products is a quite difficult matter. It is important to do so, however, because for many uses anhydrous material is required. For instance, a particularly important field is in the manufacture of rayon, where moisture-free and iron-free sodium hydroxide is a vital reagent. Improved methods have long been sought, whereby the anhydrous products could be prepared directly without the necessity for extensive purification and dehydration. The obvious method would be to react free alkali metal directly with water, but as is well known, this reaction is a most violent and dangerous one.

A similar problem which has faced industry for years is the economic utilization, or anyway the safe disposal, of by-products and residues from the anhydrous electrolysis of alkali metal halides to produce alkali metals. Alkali metals are generally prepared by electrolyzing a fused alkali metal halide at a comparatively high temperature. An alkaline earth halide is usually added to the melt to lower its melting point. The desired alkali metal is separated from the mass after electrolyzing, but it contains alkaline earth and other impurities. Purification then leaves a heel or residue of so-called "sludge." This sludge consists of the alkaline earth metal and alkali metal which is not easily separated, together with other contaminants. Such sludge is exceptionally difficult to handle and being of no economic use as such, presents a significant disposal problem. Since it contains an appreciable quantity of valuable alkali metal, attention has been given to further processing, for example, by filtration, to recover portions of the free metal content. However, complete segregation has not been possible, so that a residue always remains containing both alkali and alkaline earth metal. As described above, such sludge is more reactive and difficult to process than the pure components.

Using the manufacture of sodium as an example, fused sodium chloride is electrolyzed at about 560° C. in the presence of calcium chloride, which is added to lower the melting point. Some of the additive is itself electrolyzed, so that the product is contaminated with dissolved calcium. The sodium-calcium mixture is cooled to about 150° C. to precipitate the latter metal. The supernatant liquid sodium is then decanted, leaving a sludge residue composed of about 70 percent sodium, 20 percent calcium and 10 percent metal oxides and chlorides. If the sludge is then filtered again, the filtercake still contains about 40 percent sodium, 40 percent calcium and 20 percent of other contaminants. Sometimes potassium chloride is introduced to the electrolysis as well as calcium chloride, hence potassium may be an alkali metal component. Depending upon the particular conditions of electrolysis and the extent to which the residue is further treated to recover sodium values, the final sludge (either the initial residue as such or the refiltered filtercake) may contain anywhere from 25 percent to 95 percent by weight of sodium with between 75 percent and 5 percent by weight of calcium.

The object of the present invention is to provide a controllable process for converting the alkali metal content of alkali metal compositions, to the corresponding alkali metal hydroxide. A specific object is to provide a process for directly converting pure alkali metal to the anhydrous hydroxide, as for example, sodium to caustic soda or potassium to caustic potash. Another object is to provide a safe and controllable process for converting by-product mixtures from alkali metal production, to innocuous and easily disposable materials. A further specific object is to provide a process facilitating disposal of such by-product or residue mixtures by converting them to flowable or pumpable innocuous slurries.

Figure 2:
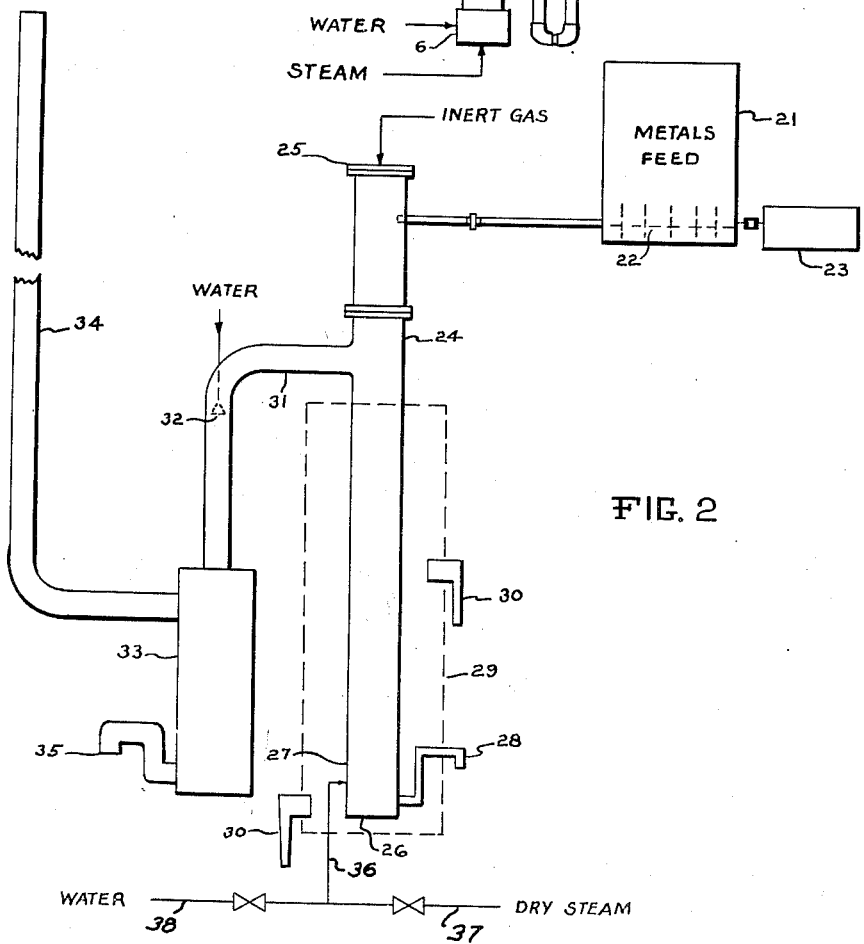

The accompanying drawing illustrates certain preferred forms of apparatus wherein the alkali metals may be treated according to this novel method. In the drawing Figure 1 represents a vertical side view of an especially simple form of reaction chamber; and Figure 2 shows a vertical side view of a somewhat more complex apparatus.

Broadly speaking, the process whereby the above mentioned important advantages are obtained comprises providing a pool of liquid alkali metal hydroxide within a confined area, introducing an alkali metal feed above the upper surface of the pool, and passing steam through the pool to contact the alkali metal at its surface, i. e., at the liquid:reactive metal interface. Reaction occurs at this interface and alkali metal hydroxide is obtained which joins the original pool. The alkali metal introduced may be in pure form or contaminated with various impurities like alkaline earth metals and their compounds. Mixtures of alkali metals are also contemplated, of course. The steam flow is preferably maintained in excess, that is, at a rate greater than could react with the alkali metal present. Thus, the hydrogen evolved by the reaction is diluted and swept out of the reaction space with the excess steam, and the possibility of exposure of the reacting mixture to air, and hence of violent reactions, is precluded. Although a substantial excess of steam is used, the rate should not be so great that the reacting materials are appreciably entrained or carried out of the reaction zone by the steam and gaseous reaction products. In those embodiments wherein the steam rate for adequate temperature control would result in excessive velocity, steam of less than 100 percent quality may be used.

More specifically, and according to an embodiment of this invention for processing sludges, the fluid pool comprises a liquid phase consisting largely of either fused alkali hydroxide or a very concentrated solution thereof. This liquid phase has suspended therein solids, these being oxides of the alkaline earth component of the feed. In addition, minor quantities of other solid impurities, principally the halides of the initial feed metals, are present. The reactor generally, and the portion in direct contact with this pool is preferably constructed of some corrosion resistant metal such as nickel, Monel metal, or the like. A feed stream of sludge residues from an alkali metal halide electrolysis is floated on the upper surface of this pool. Sludge from sodium chloride operations, e. g., a sodium-calcium residue like those above discussed, is commonly used, in which case the underlying pool is predominantly molten caustic soda. However, it is equally feasible to employ sludges derived from electrolysis of the other alkali chlorides. If the residue is high in alkaline earth content, if it is second filtercake, for instance, and contains roughly equal amounts of sodium and calcium, the product of its reaction with steam will contain 50 percent or more of lime and the resulting slurry will not be free-flowing at reasonable temperatures. Consequently, it is best to work with sludges which contain more alkali metal than alkaline earth metal, i. e., so that the molten pool will comprise a major proportion of alkali metal hydroxide and less than about 40 percent by weight of alkaline earth oxides and hydroxides, calculated as oxides.

While the sludge is being introduced at the upper surface of the molten pool, steam, preferably containing a minor amount of liquid water, is charged within the pool for passage to its surface and for reaction there with the sludge. A fluid product of mixed metal hydroxides thereby results. For some reason not presently understood the sludge - steam reaction proceeds smoothly. Despite the fact that the well-known reaction of liquid water with alkali metal is violently explosive, this reaction with steam in lieu of water is safe and controllable. At the same time, it is surprising but true that the presence of a minor amount of liquid water in the steam as introduced to the pool is most desirable to achieve best results. The water passes first through the hot liquid and should desirably be converted to steam by the time it reaches the sludge:pool interface. The cooling effect of the water, i. e., the large amount of heat which it absorbs from the area during its conversion to steam, is believed to be a major reason for the success of this novel feature. It is possible to conduct the reaction with dry steam, but very high temperatures may be reached in a large diameter reactor having proportionately less radiation area, unless a rapid steam flow rate through the reaction zone is employed. Consequently, in commercial operations to avoid too high steam velocity, it is best to employ steam containing liquid water in amount sufficient to remove heat from the sludge-steam reaction, but insufficient to allow its continued presence in liquid form at the reaction zone. In those few cases, for example, where the alkaline earth metal content is such that the fused product is not readily flowable, the temperature of operation and the quality of the steam used are both lowered. This will assure that the bottom product is readily removed as a pumpable or flowable slurry, rather than as a stiff mud.

According to a second specific embodiment of this invention, a pool of anhydrous, molten alkali metal hydroxide is maintained in a reaction space, and a feed stream of substantially pure alkali metal is floated on the pool surface. The procedure is generally similar and the operating conditions analogous to those hereinabove described for processing sludge. However, there is, of course, no limitation as to content of alkaline earth compounds. Simply maintaining the pool well above the fusion temperature assures fluidity of the product. This product is anhydrous purified alkali metal hydroxide, and can be discharged to appropriate casting or flaking equipment.

Salient features of preferred modes of carrying out the present novel process are readily understood by reference to the accompanying drawing. Thus, in Figure 1 the alkali metal feed stream is conveyed from a hopper or similar storage container 1 (shown schematically), by means of a screw drive 2 operated by a conventional motor 3 (not detailed). The metals feed is thereby introduced to reactor 4. A pool of fluid alkali metal hydroxide is already provided in the reactor, its surface being just about at position 7. Inert gas may be initially added at 5 to purge the system of air and thus prevent unwanted hazards. As the feed metal enters the reactor, it falls to the pool surface at 7 and floats thereon. Concurrently dry steam is charged into the pool near the reactor bottom 6, passes upward to the surface 7, and there reacts with the metals feed. When desired, a small amount of water is fed directly to the pool. This has the same effect as charging wet steam, the water being proportioned to immediately vaporize prior to contacting the alkali metal. Products of the reaction join the original pool, swelling its volume until it overflows at line 8. This overflow is then collected and the alkali metal hydroxide recovered or the mass otherwise further processed in any desired way.

In the apparatus of Figure 2, as in Figure 1, metals feed from container 21 is conveyed by screw conveyor 22 into reaction chamber 24, the screw conveyor being driven by motor 23. The feed floats on the surface 27 of a fluid alkali metal hydroxide pool. Inert gas is added at the reactor top 25 when necessary to purge the system. The steam line 37 and water line 38 are joined outside the reactor to provide wet steam which is fed by a line 36 near the lower end 26 of the reactor. This mode of operation is preferable to separate feed of water. Reaction products again swell the volume of the pool and the overflow passes out at a leg 28. Figure 2 differs from Figure 1 in that the reaction zone is enclosed in a firebrick setting (indicated in outline 29) and is externally heated as necessary by gas burners 30. Hydrogen and excess steam exit via a conduit 31, where they are washed with water at a spray nozzle 32. The spray is collected in a chamber 33 and recovered at a line 35, while remaining gases finally leave the system through a vent 34.

The temperatures employed in carrying out the new process will obviously depend upon the particular alkali metal under treatment. External heating is not essential once the reaction is under way, especially with large reactors; but in practice a surplus of heat is frequently used and the excess compensated by increased steam flow or water content. As a general method of control, it is preferred to maintain a relatively uniform temperature in the pool. The feed rate of alkali metal, or mixture of alkali-alkaline earth metals, is varied with steam flow held constant. With a temperature rise above the desired point, the rate of metal feed is reduced. Similarly, as the temperature drops below the control point, the rate of metal feed is increased. In all instances, an excess of steam is used. By excess is meant that the feed rate is greater than could be consumed by metals within the reactor. On the other hand, the excess should not be so great that the velocity entrains or blows reacting materials out of the reactor.

Corrosion of the reactor metals of construction is commonly a difficult problem and operating temperatures must accordingly be a compromise. They should be sufficiently high to maintain the initial pool in liquid or predominantly liquid form and to insure that the reaction products which join the pool will flow freely in admixture therewith. However, they should be sufficiently low so that the corrosion rate of the metal of construction is not too great. In processing sodium-calcium sludge residues over a fused caustic pool, for example, the temperature of the pool should be above 600° C. to insure fluidity, hence ready withdrawal, of the resulting caustic-lime slurry. On the other hand, the corrosion rate of metals, particularly the nickel which is usually employed for such reactors, increases rapidly above 600° C. The preferred pool temperature range with these reactants, therefore, is substantially between 600° and 700° C., and preferably about 600° C. The desired metal hydroxide products are then obtained in fluid form as part of the molten pool below the reaction zone. When pure sodium and lime-free anhydrous sodium hydroxide are involved, however, pool temperatures of only about 325° to 400° C. are satisfactory.

Where it is desired only to dispose safely of electrolytic sludges, the composition of this underlying pool is unimportant, except that fluidity thereof should be maintained. It really serves in part as a heat-exchanging medium, in that it receives the hot products of the reaction and in turn delivers heat to the entering steam feed. When necessary, the fluidity of the pool or product stream is assured by using steam of such low quality that a portion of the water is not fully vaporized, but adds to the pool. This further assures the fluidity of the bottoms stream.

The reaction products from the above embodiment, being a slurry of alkaline earth hydroxide or oxide in fused caustic (or in a concentrated solution of caustic) is a readily available and inexpensive alkaline reagent, particularly suitable for neutralizing acid wastes.

In addition to its important function as a heat interchanging medium, the pool in effect provides a hold up volume whereby the composition of the material discharged is kept uniform. The depth of the pool can be varied at will through a wide range, the depth in actuality being set by the overflow drawoff. In normal practice, a depth of several inches to two feet above the point of steam introduction is used. This assures that the steam will adequately agitate the pool during its passage upward. This result is important when the pool results from processing sludges having alkaline earth metal components. The agitation assures uniform dispersion of the solid impurities, for example calcium oxide, present in the pool in such instances.

It is readily seen that the steam reactant is an important variable in the process. The steam is introduced at a rate in substantial excess of that stoichiometrically corresponding to the active metal feed rate. In actual operation, the steam rate is held constant and the active metals feed stream is varied, but is always at a rate such that the steam rate is in excess. As a general guide, the steam and metal feed rates are such that the steam is about three to five times the theoretically required rate.

This excess of steam refers to total steam, that is, including the water entrained in steam of less than 100 percent quality. As previously mentioned, use of such wet steam provides an additional control means for the process, by absorbing large amounts of heat by the vaporization of water. This is an important factor at high production rates and in larger apparatus, where the external area, for heat radiation, is low relative to the volume of the reaction space. Generally, in the reaction of a sodium-calcium sludge, for example, steam quality of from 75 to 90 percent is customary.

The following working example shows the advantages and mode of operation of the process more fully.

*Example*

The apparatus of Figure 2 was here employed. The reactor 24 was a cylindrical chamber 8 inches in diameter and 8 feet tall. In operation, a pool of fluid reaction product of about one foot in depth was maintained, overflowing through line 28, to maintain a relatively constant average level 27. The reactor 24 was enclosed in its lower part in a firebrick setting 29 and heat was supplied by gas burners 30.

Sodium-calcium sludge, having approximately 72 percent by weight of free sodium, 19 percent calcium, and about 9 percent other materials (such as oxides of sodium and calcium), was charged to the hopper 21. This sludge was introduced to the reaction chamber at an average rate of about ½ pound per minute by means of screw drive assembly 22 and 23.

Steam was introduced into the fluid product pool at the bottom of the reactor, through line 36. The steam fed was formed by blending dry steam obtained through a line 37 and water fed through a line 38, the quality of the wet steam so-produced being from 75 to 100 percent. The total steam rate approximated about four times the rate theoretically required for conversion of all the free metal fed.

Operation was smooth, the temperature of the product pool being readily maintained at an average level of about 600° C. The product was continuously discharged through overflow leg 28 and contained 76 percent sodium hydroxide, 23 percent calcium oxide and hydroxide, and about 1 percent chlorides.

The foregoing example illustrates the process as employed in treating or disposing sodium-calcium sludge. When processing pure sodium, for example, to make anhydrous caustic soda, the operation is very similar, except that dry steam is preferably used. In addition, the reaction conditions need not be so rigorous. In other words an operating temperature of about 400° C. is quite satisfactory for producing anhydrous pure sodium hydroxide. If desired, lower temperatures can be used, even such as result in a very concentrated aqueous solution. Operating in this latter manner, however, does not take advantage of the particular feature of this embodiment, that is, that a high grade anhydrous caustic can be produced directly without the necessity of subsequent purification.

From the foregoing description and example it will be seen that the invention is capable of being advantageously operated in a wide variety of embodiments. It will therefore be understood that the process is not limited except by the claims below.

What is claimed is:

1. A process for converting a sodium metal feed which comprises providing a pool of liquid sodium hydroxide in a confined oxygen-free space, continuously introducing a feed having at least 25 percent by weight free sodium, on the upper surface of said pool and floating thereon, said feed being of lower density than the said liquid pool, and passing steam upwardly through the pool at a rate greater than could entirely react with the floating sodium, reacting part of the steam with the sodium to form additional sodium hydroxide and hydrogen, collecting the so-formed sodium hydroxide in the pool and concurrently discharging an equivalent amount of sodium hydroxide from the pool, and discharging the hydrogen from the confined space with the unreacted steam.

2. The process of claim 1 wherein the feed is a sludge residue obtained from purification of electrolytically produced sodium, comprising from 25 to 95 weight percent sodium, and 75 to 5 weight percent calcium.

3. The process according to claim 1 wherein the feed is substantially pure sodium.

4. The process of claim 1 further defined in that the steam contains liquid water in amount sufficient to remove heat of the resulting reaction at the pool surface but insufficient to allow the presence of liquid water at the reaction zone.

5. A process for converting sodium metal to anhydrous sodium hydroxide comprising providing a pool of molten anhydrous sodium hydroxide within a confined oxygen-free space, continuously feeding liquid sodium to and floating on the surface of said pool, passing steam upwardly through the pool at a rate of from three to five moles of steam per atom of sodium fed, reacting part of the steam with the sodium to form additional sodium hydroxide and hydrogen, collecting the so-formed sodium hydroxide in the pool and concurrently withdrawing an equivalent amount of sodium hydroxide from the pool and discharging the hydrogen from the confined space with the unreacted steam.

FRANK L. PADGITT.

References Cited in the file of this patent

UNITED STATES PATENTS

| Number | Name | Date |
|---|---|---|
| 623,693 | Acker | Apr. 25, 1899 |
| 1,829,693 | Ward | Oct. 27, 1931 |
| 2,083,648 | Gorke | June 15, 1937 |
| 2,392,236 | Edwards | Jan. 1, 1946 |
| 2,527,443 | Padgitt | Oct. 24, 1950 |

OTHER REFERENCES

J. W. Mellor's "A Comprehensive Treatise on Inorganic and Theoretical Chemistry," vol. 2, 1922 ed., page 469, Longmans, Green and Co., N. Y.